US012739575B2

(12) United States Patent
Müller

(10) Patent No.: US 12,739,575 B2
(45) Date of Patent: Sep. 15, 2026

(54) OPERATING A HEARING DEVICE FOR CLASSIFYING AN AUDIO SIGNAL TO ACCOUNT FOR USER SAFETY

(71) Applicant: SONOVA AG, Staefa (CH)

(72) Inventor: Stephan Müller, Uster (CH)

(73) Assignee: Sonova AG, Staefa (CH)

( * ) Notice: Subject to any disclaimer, the term of this patent is extended or adjusted under 35 U.S.C. 154(b) by 437 days.

(21) Appl. No.: 18/419,257

(22) Filed: Jan. 22, 2024

(65) Prior Publication Data

US 2024/0276159 A1 Aug. 15, 2024

(30) Foreign Application Priority Data

Feb. 13, 2023 (EP) .................................... 23156320

(51) Int. Cl.
*H04R 25/00* (2006.01)

(52) U.S. Cl.
CPC ........... *H04R 25/505* (2013.01); *H04R 25/40* (2013.01); *H04R 2225/41* (2013.01); *H04R 2225/55* (2013.01)

(58) Field of Classification Search
CPC .. H04R 25/505; H04R 25/40; H04R 2225/41; H04R 2225/55; H04R 2225/39; H04R 25/70
See application file for complete search history.

(56) References Cited

U.S. PATENT DOCUMENTS

2021/0092534 A1* 3/2021 Fichtl .................. H04R 25/505
2021/0195347 A1* 6/2021 Boretzki ............... H04R 25/70

FOREIGN PATENT DOCUMENTS

DE 102014207311 A1 * 3/2015 ............ H04R 25/50
DE 102019206743 A1 11/2020
EP 2201793 B1 3/2011
EP 1858292 B1 6/2014
EP 3036915 B1 10/2018
EP 1858292 B2 * 2/2022 ............ H04R 25/70
WO 2020051735 A1 3/2020
WO 2020152323 A1 7/2020

OTHER PUBLICATIONS

European Search Report and Written Opinion received in European Application No. 23156320.6 received Jul. 14, 2023.

* cited by examiner

*Primary Examiner* — Vivian C Chin
*Assistant Examiner* — Annabelle Kang
(74) *Attorney, Agent, or Firm* — ALG Intellectual Property, LLC

(57) ABSTRACT

The disclosure relates to a method of operating a hearing device comprising an input transducer and an output transducer, the method comprising classifying an audio signal by attributing at least one class from a plurality of predetermined classes to the audio signal, wherein different audio processing instructions are associated with different classes; and modifying the audio signal by applying the audio processing instructions associated with the class attributed to the audio signal. The disclosure further relates to a hearing device configured to perform the method.

14 Claims, 2 Drawing Sheets

OPERATING A HEARING DEVICE FOR CLASSIFYING AN AUDIO SIGNAL TO ACCOUNT FOR USER SAFETY

RELATED APPLICATIONS

The present application claims priority to EP Patent Application No. 23156320.6, filed Feb. 13, 2023, the contents of which are hereby incorporated by reference in their entirety.

BACKGROUND

Hearing devices may be used to improve the hearing capability or communication capability of a user, for instance by compensating a hearing loss of a hearing-impaired user, in which case the hearing device is commonly referred to as a hearing instrument such as a hearing aid, or hearing prosthesis. A hearing device may also be used to output sound based on an audio signal which may be communicated by a wire or wirelessly to the hearing device. A hearing device may also be used to reproduce a sound in a user's ear canal detected by an input transducer such as a microphone or a microphone array. The reproduced sound may be amplified to account for a hearing loss, such as in a hearing instrument, or may be output without accounting for a hearing loss, for instance to provide for a faithful reproduction of detected ambient sound and/or to add audio features of an augmented reality in the reproduced ambient sound, such as in a hearable. A hearing device may also provide for a situational enhancement of an acoustic scene, e.g. beamforming and/or active noise cancelling (ANC), with or without amplification of the reproduced sound. A hearing device may also be implemented as a hearing protection device, such as an earplug, configured to protect the user's hearing. Different types of hearing devices configured to be be worn at an ear include earbuds, earphones, hearables, and hearing instruments such as receiver-in-the-canal (RIC) hearing aids, behind-the-ear (BTE) hearing aids, in-the-ear (ITE) hearing aids, invisible-in-the-canal (IIC) hearing aids, completely-in-the-canal (CIC) hearing aids, cochlear implant systems configured to provide electrical stimulation representative of audio content to a user, a bimodal hearing system configured to provide both amplification and electrical stimulation representative of audio content to a user, or any other suitable hearing prostheses. A hearing system comprising two hearing devices configured to be worn at different ears of the user is sometimes also referred to as a binaural hearing device. A hearing system may also comprise a hearing device, e.g., a single monaural hearing device or a binaural hearing device, and a user device, e.g., a smartphone and/or a smartwatch, communicatively coupled to the hearing device.

Hearing devices are often employed in conjunction with communication devices, such as smartphones or tablets, for instance when listening to sound data processed by the communication device and/or during a phone conversation operated by the communication device. More recently, communication devices have been integrated with hearing devices such that the hearing devices at least partially comprise the functionality of those communication devices. A hearing system may comprise, for instance, a hearing device and a communication device.

In recent times, some hearing devices are also increasingly equipped with different sensor types. Traditionally, those sensors often include an input transducer to detect a sound, e.g., a sound detector such as a microphone or a microphone array. An amplified and/or signal processed version of the detected sound may then be outputted to the user by an output transducer, e.g., a receiver, loudspeaker, or electrodes to provide electrical stimulation representative of the outputted signal. In an effort to provide the user with even more information about himself and/or the ambient environment, various other sensor types are progressively implemented, in particular sensors which are not directly related to the sound reproduction and/or amplification function of the hearing device. Those sensors include inertial sensors, such as accelerometers, allowing to monitor the user's movements. Physiological sensors, such as optical sensors and bioelectric sensors, are mostly employed for monitoring the user's health.

Hearing devices have been equipped with a sound classifier to classify an ambient sound. An input transducer can provide an audio signal representative of the ambient sound. The sound classifier can classify the audio signal allowing to identify different listening situations by determining a characteristic from the audio signal and assigning the audio signal to at least one relevant class from a plurality of predetermined classes depending on the characteristic. Usually, the sound classification does not directly modify a sound output of the hearing device. Instead, different audio processing instructions are stored in a memory of the hearing device specifying different audio processing parameters for a processing of the audio signal, wherein the different classes are each associated with one of the different audio processing instructions. After assigning the audio signal to one or more classes, the one or more associated audio processing instructions are executed. The audio processing parameters specified by the audio processing instructions can then provide a processing of the audio signal customized for the particular listening situation corresponding to the at least one class identified by the classifier. The different listening situations may comprise, for instance, different classes of listening conditions and/or different classes of sounds. For example, the different classes may comprise speech and/or nonspeech and/or music and/or traffic noise and/or other ambient noise.

A mixed mode classifier, as disclosed in EP 1 858 292 B1, can attribute one, two or more classes to the audio signal, wherein the different audio processing instructions associated with the different classes can be mixed in dependence of class similarity factors. The class similarity factors are indicative of a similarity of the current acoustic environment with a respective predetermined acoustic environment associated with the different classes. The mixing of the different audio processing instructions may imply, e.g., a linear combination of base parameter sets representing the audio processing instructions associated with the different classes, or other (non-linear) ways of mixing the audio processing instructions. The different audio processing instructions may be provided as sub-functions, which can be included into a transfer function used by the signal processing circuit according to the desired mixing of the audio processing instructions. For example, audio processing instructions, e.g., in the form of the base parameter sets, related to a beamformer and/or a gain model (i.e., an amplification characteristic) may be mixed depending on whether or to which degree the audio signal is attributed, e.g., by the class similarity factors, to one or more of the classes music and/or speech in noise and/or speech.

EP 2 201 793 B1 discloses a classifier configured for an automatic adaption of the audio processing instructions associated with the different classes depending on adjustments performed by the user. Adjustment data indicative of the user adjustments can be logged, e.g., stored in a storage unit, and evaluated to learn correction data for correcting the audio processing instructions. In a mixed mode classifier, for a current sound environment and depending on the adjustment data, an offset can be learned for the mixed base parameter sets representing the audio processing instructions associated with the different classes. For the purpose of learning, correction data may be separately provided for different classes.

The classification may also be based on a statistical evaluation of the audio signal, as disclosed in EP 3 036 915 B1. More recently, machine learning (ML) algorithms have been employed to classify the ambient sound. The classifier can be implemented by an artificial intelligence (AI) chip which may be configured to classify the audio signal by at least one deep neural network (DNN). The classifier may comprise a sound source separator configured to separate sound generated by different sound sources, for instance a conversation partner, passengers passing by the user, vehicles moving in the vicinity of the user such as cars, airborne traffic such as a helicopter, a sound scene in a restaurant, a sound scene including road traffic, a sound scene during public transport, a sound scene in a home environment, and/or the like. Examples of such a sound source separator are disclosed in international patent application Nos. PCT/EP 2020/051 734 and PCT/EP 2020/051 735, and in German patent application No. DE 2019 206 743.3.

When classifying the audio signal in such a way to apply different audio processing instructions depending thereon, however, the safety of the user wearing the hearing device can be compromised. In particular, in some cases, the attributing of one or more of the classes to the audio signal can be ambivalent or dubious, e.g., when two or more classes are each associated with a predetermined acoustic environment which is similar to the current acoustic environment represented by the audio signal. Inevitably, in such a case, a potentially unintended and/or inappropriate and/or inadequate class may thus be chosen from the classes to be attributed to the audio signal, e.g., due to a seemingly larger similarity of the acoustic environment associated with this class with the current acoustic environment as compared to another class which would be intended and/or more appropriate for the current acoustic environment.

Such a misclassification could cause a potential harm for the user. For example, the audio processing instructions associated with the inadequately attributed class may provide for a sound reproduction which is compromising the user's ability to recognize a sound from a potential source of danger in the environment, e.g., a car approaching the user in a traffic situation. As another example, the audio processing instructions associated with the inadequately attributed class may unintentionally restrict the user's acoustic perception in a desired listening direction, e.g., a walking direction of the user. As a further example, the audio processing instructions associated with the inadequately attributed class may emphasize sound from a non-hazardous sound source, e.g., music and/or speech, to the expense of other sound which would be vital to recognize a potentially dangerous situation in the environment. As yet another example, the audio processing instructions associated with the inadequately attributed class may distract a user in any other ways from a potentially dangerous situation.

To illustrate, the audio processing instructions associated with two alternative classes may provide for a beamforming with a directivity in a front direction of the user and a directivity in a back direction of the user. The directivity facing in the back direction of the user can be useful, for instance, in a current acoustic environment inside a car in which the user sitting in the front seat is communicating with people in the backseat. The directivity in the front direction of the user can be employed, e.g., in an acoustic environment in which the user looks in the direction of a conversation partner. Further, the directivity in the front direction corresponds to the direction of the user's eyesight and complements his visual field, e.g., when the user is walking or looking around or reorienting himself, which contributes to the user's safety. Therefore, when the directivity of the beamformer points in the front direction, the safety of the user is at a much lower risk in a case of a misclassification of the audio signal as compared to when the directivity of the beamformer points in the back direction. In consequence, a potential inadequate attribution of the audio signal to a class associated with the audio processing instructions providing for a directivity of the beamformer in the back direction instead of the front direction can pose a security risk to the user.

In some cases, at least some of the classes which are available to be attributed to the audio signal can be mutually exclusive classes. For instance, a mixed mode classifier may select only one of those classes to be attributed to the audio signal and disregard the other one when the classes are mutually exclusive. To illustrate, referring to the above described example in which two alternative classes may provide for a beamforming with a directivity in a front direction and a directivity in a back direction of the user, those classes may be mutually exclusive because mixing up the different audio processing instructions associated with those different classes would be rather unfavorable and/or confusing for the user. E.g., in a case in which the audio processing instructions associated with those mutually exclusive classes would be mixed up, the user would be simultaneously exposed, at least to a certain extent, to the audio detected from the front direction and the back direction of the user, wherein the audio impacting the user from the lateral sides of the user would be disregarded in contrast, e.g., to an omnidirectional audio processing. This would result in a rather unnatural listening experience for the user in which the location of a potentially dangerous sound source would be unknown. By only allowing a mutually exclusive attribution of the audio signal to one of the classes, the sound source can be assumed by the user as being located either behind or in front of the user. However, in such a case, an inadequate attribution of the audio signal to one of the mutually exclusive classes can be even more confusing for the user. E.g., when the user is expecting a directivity of the beamformer in a front direction during walking but the audio signal has been inappropriately attributed to another acoustic scene, such as an acoustic environment inside a car, which is providing for a directivity of the beamformer in the back direction, the user can be misled with respect to the location of a potential source of danger. Thus, when the audio signal is inadequately attributed to one of a plurality of mutually exclusive classes, a resulting security risk for the user can be even aggravated.

BRIEF DESCRIPTION OF THE DRAWINGS

Reference will now be made in detail to embodiments, examples of which are illustrated in the accompanying drawings. The drawings illustrate various embodiments and are a part of the specification. The illustrated embodiments are merely examples and do not limit the scope of the disclosure. Throughout the drawings, identical or similar reference numbers designate identical or similar elements. In the drawings.

DETAILED DESCRIPTION OF THE DRAWINGS

Figure 1:
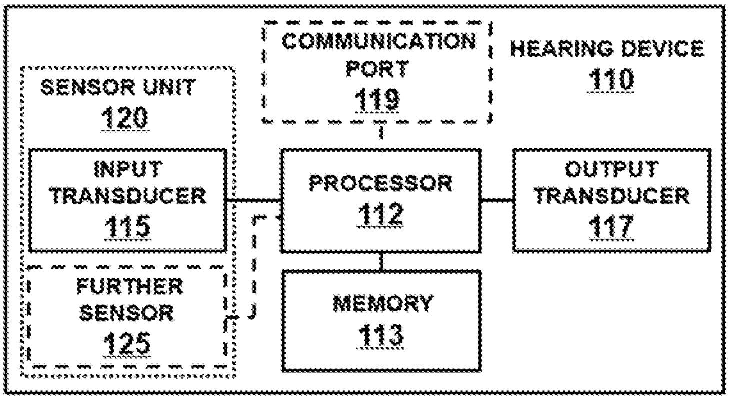
FIG. 1 schematically illustrates an exemplary hearing device.

The disclosure relates to method of operating a hearing device configured to be worn at an ear of a user, the hearing device comprising an input transducer configured to provide an audio signal and an output transducer configured to generate a sound output according to the audio signal after a modifying of the audio signal, wherein the method comprises classifying the audio signal by attributing at least one class from a plurality of predetermined classes to the audio signal, and modifying the audio signal by applying the audio processing instructions associated with the class attributed to the audio signal. The disclosure further relates to a hearing device.

It is an object of the present disclosure to avoid at least one of the above mentioned disadvantages and to propose a method of operating a hearing device in which the risks for the user of attributing the audio signal to an inadequate class can be reduced and/or a safety of the user during classifying the audio signal and modifying the audio signal depending on the classification can be enhanced. It is another object to provide for an improved operation of the hearing device in which a potential benefit of the audio processing instructions associated with different sound classes is weighted or gauged with a measure of a potential harm for the user in a case in which the audio processing instructions would be activated in an inappropriate moment. It is yet another object to account for a limited reliability and/or accuracy of an environmental sound classification, in particular by a classifier included in a hearing device, by opting in the event of a potential misclassification for audio processing instructions which are related to a higher user safety. It is a further object to provide a hearing device which is configured to operate in such a manner.

At least one of these objects can be achieved by a method of operating a hearing device configured to be worn at an ear of a user comprising features described herein and/or a hearing device comprising the features described herein.

Accordingly, the present disclosure proposes a method of operating a hearing device configured to be worn at an ear of a user, the hearing device comprising an input transducer configured to provide an audio signal indicative of a sound detected in the environment of the user; and an output transducer configured to generate a sound output according to the audio signal after a modifying of the audio signal, wherein the method comprises

- classifying the audio signal by attributing at least one class from a plurality of predetermined classes to the audio signal, wherein different audio processing instructions are associated with different classes; and
- modifying the audio signal by applying the audio processing instructions associated with the class attributed to the audio signal, wherein the audio processing instructions associated with at least one of said classes comprise audio processing instructions related to a lower user safety which can be replaced by audio processing instructions related to a higher user safety, and the method further comprises
- determining a confidence measure indicative of a probability that the class is correctly attributed to the audio signal; and, when the probability indicated by the confidence measure is below a threshold and the audio processing instructions associated with the class attributed to the audio signal comprise the audio processing instructions related to the lower user safety,
- applying, during said modifying of the audio signal, the audio processing instructions related to the higher user safety in place of the audio processing instructions related to the lower user safety.

Thus, in the event of a potential misclassification, which may be indicated by the confidence measure determined below the threshold, applying of the audio processing instructions related to the higher user safety can avoid the hazard of a potentially false activation of the audio processing instructions related to the lower user safety. As a result, a safety risk for the user which would be caused by such a false activation of the audio processing instructions related to the lower user safety can be mitigated.

The present disclosure also proposes a non-transitory computer-readable medium storing instructions that, when executed by a processor, cause a hearing device to perform operations of the method.

The present disclosure also proposes a hearing device configured to be worn at an ear of a user, the hearing device comprising an input transducer configured to provide an audio signal indicative of a sound detected in the environment of the user; a memory configured to store a plurality of audio processing instructions, wherein different audio processing instructions are associated with different classes which can be attributed to the audio signal; an output transducer configured to generate a sound output according to the audio signal after a modifying of the audio signal; and a processor configured to

- classify the audio signal by attributing at least one of said classes to the audio signal; and
- modify the audio signal by applying the audio processing instructions associated with the class attributed to the audio signal, wherein the audio processing instructions associated with at least one class comprise audio processing instructions related to a lower user safety which can be replaced by audio processing instructions related to a higher user safety, wherein the processor is further configured to
- determine a confidence measure indicative of a probability that the class is correctly attributed to the audio signal; and, when the probability indicated by the confidence measure is below a threshold and the audio processing instructions associated with the class attributed to the audio signal comprise the audio processing instructions related to the lower user safety,
- apply, during said modifying of the audio signal, the audio processing instructions related to the higher user safety in place of the audio processing instructions related to the lower user safety.

Subsequently, additional features of some implementations of the method of operating a hearing device and/or the hearing device are described. Each of those features can be provided solely or in combination with at least another feature. The features can be correspondingly provided in some implementations of the method and/or the hearing device.

In some implementations, the method further comprises monitoring said classifying of the audio signal over time to determine a change rate in which different classes are attributed to the audio signal, wherein the confidence measure is determined based on the change rate.

In some implementations, the method further comprises determining, based on the audio signal, a volume level of the detected sound, wherein the confidence measure is determined based on the volume level. In some implementations, the method further comprises determining, based on the audio signal, a direction of arrival (DOA) from which at least part of the detected sound arrives at the user, wherein the confidence measure is determined based on the direction of arrival. In some implementations, the method further comprises identifying, based on the audio signal, a property of a sound source in the environment of the user from which at least part of the detected sound is emitted, wherein the confidence measure is determined based on the property of the sound source.

In some implementations, the hearing device further comprising a sensor configured to provide sensor data indicative of a property of the user and/or an ambient environment of the user, wherein the method further comprises determining whether the sensor data fulfills a condition, wherein the probability indicated by the confidence measure is increased when the condition is fulfilled. In some implementations, the sensor comprises a movement sensor configured to provide at least part of the sensor data as movement data indicative of a movement of the hearing device; and/or a location sensor configured to provide at least part of the sensor data as location data indicative of a current location of the user; and/or a physiological sensor configured to provide at least part of the sensor data as physiological data indicative of a physiological property of the user; and/or an environmental sensor configured to provide at least part of the sensor data as environmental data indicative of a property of the environment of the user.

In some implementations, the method further comprises determining, based on the movement data, whether the user is turning his head, wherein the condition is determined to be fulfilled depending on whether the user is turning his head; and/or determining, based on the movement data, whether the user is in a resting position, wherein the condition is determined to be fulfilled depending on whether the user is in the resting position; and/or determining, based on the movement data, whether the user is walking or running, wherein the condition is determined to be fulfilled depending on whether the user is walking or running; and/or determining, based on the movement data, a posture of the user, wherein the condition is determined to be fulfilled depending on the posture of the user; and/or determining, based on the movement data, an orientation of the user, wherein the condition is determined to be fulfilled depending on the orientation.

In some implementations, the audio processing instructions related to the lower user safety provide for a directivity of audio content in the modified audio signal. In some implementations, the directivity points in a direction of the user's back. In some implementations, the audio processing instructions related to the higher user safety provide for an omnidirectional audio content in the modified audio signal.

In some implementations, the method further comprises monitoring, when the probability indicated by the confidence measure is below the threshold and the audio processing instructions related to the higher user safety are different from the audio processing instructions associated with the class attributed to the audio signal, the confidence measure over time to determine when said probability changes above the threshold; and, when said probability is above the threshold, applying, during said modifying of the audio signal, the audio processing instructions associated with the class attributed to the audio signal in place of the audio processing instructions related to the higher user safety. In particular, the applied audio processing instructions associated with the class attributed to the audio signal may be the audio processing instructions related to the lower user safety. Thus, by monitoring the probability indicated by the confidence measure over time, it can be ensured that the audio processing instructions related to the lower user safety may be only applied when the probability indicated by the confidence measure is above the threshold. Accordingly, a safety for the user when operating the hearing device can be increased by ensuring that, when the probability indicated by the confidence measure is above the threshold, only the audio processing instructions related to the higher user safety may be applied.

In some implementations, the audio processing instructions related to the higher user safety are associated with at least one of said classes different from the class comprising the audio processing instructions related to the lower user safety.

In some implementations, during said classifying of the audio signal, at least two of said classes are attributed to the audio signal, and, during the modifying of the audio signal, the audio processing instructions associated with the two classes attributed to the audio signal are applied, wherein, during said determining of the confidence measure, the confidence measure is determined to be indicative of a probability that at least one of the two classes attributed to the audio signal is correctly attributed. In some instances, the classifier is a mixed-mode classifier.

FIG. 1 illustrates an exemplary hearing device 110 configured to be worn at an ear of a user. Hearing device 110 may be implemented by any type of hearing device configured to enable or enhance hearing or a listening experience of a user wearing hearing device 110. For example, hearing device 110 may be implemented by a hearing aid configured to provide an amplified version of audio content to a user, a sound processor included in a cochlear implant system configured to provide electrical stimulation representative of audio content to a user, a sound processor included in a bimodal hearing system configured to provide both amplification and electrical stimulation representative of audio content to a user, or any other suitable hearing prosthesis, or an earbud or an earphone or a hearable.

Different types of hearing device 110 can also be distinguished by the position at which they are worn at the ear. Some hearing devices, such as behind-the-ear (BTE) hearing aids and receiver-in-the-canal (RIC) hearing aids, typically comprise an earpiece configured to be at least partially inserted into an ear canal of the ear, and an additional housing configured to be worn at a wearing position outside the ear canal, in particular behind the ear of the user. Some other hearing devices, as for instance earbuds, earphones, hearables, in-the-ear (ITE) hearing aids, invisible-in-the-canal (IIC) hearing aids, and completely-in-the-canal (CIC) hearing aids, commonly comprise such an earpiece to be worn at least partially inside the ear canal without an additional housing for wearing at the different ear position.

As shown, hearing device 110 includes a processor 112 communicatively coupled to a memory 113, an input transducer 115, and an output transducer 117. Hearing device 110 may include additional or alternative components as may serve a particular implementation. Input transducer 115 may be implemented by any suitable device configured to detect sound in the environment of the user and to provide an input audio signal indicative of the detected sound, e.g., a microphone or a microphone array. Output transducer 117 may be implemented by any suitable audio transducer configured to output an output audio signal to the user, for instance a receiver of a hearing aid, an output electrode of a cochlear implant system, or a loudspeaker of an earbud.

Processor 112 is configured to receive, from input transducer 115, an input audio signal indicative of a sound detected in the environment of the user; to classify the input audio signal by attributing at least one class from a plurality of predetermined classes to the input audio signal, wherein different audio processing instructions are associated with different classes; and to modify the input audio signal by applying the audio processing instructions associated with the class attributed to the audio signal, wherein the modified input audio signal is provided to output transducer 117 as an output audio signal to generate a sound output according to the output audio signal. The audio processing instructions associated with at least one of said classes comprise audio processing instructions related to a lower user safety which can be replaced by audio processing instructions related to a higher user safety. Processor 112 is further configured to determine a confidence measure indicative of a probability that the class is correctly attributed to the input audio signal, and, when the probability indicated by the confidence measure is below a threshold and the audio processing instructions associated with the class attributed to the audio signal comprise the audio processing instructions related to the lower user safety, to apply, during said modifying of the input audio signal, the audio processing instructions related to the higher user safety in place of the audio processing instructions related to the lower user safety. These and other operations, which may be performed by processor 112, are described in more detail in the description that follows.

Memory 113 may be implemented by any suitable type of storage medium and is configured to maintain, e.g. store, data controlled by processor 112, in particular data generated, accessed, modified and/or otherwise used by processor 112. For example, memory 113 may be configured to store instructions used by processor 112 to process the input audio signal received from input transducer 115, e.g., audio processing instructions in the form of one or more audio processing programs. The audio processing programs may comprise different audio processing instructions of modifying the input audio signal received from input transducer 115. For instance, the audio processing instructions may include algorithms providing a gain model, noise cleaning, noise cancelling, wind noise cancelling, reverberation cancelling, narrowband coupling, beamforming, in particular static and/or adaptive beamforming, and/or the like.

As another example, memory 113 may be configured to store instructions used by processor 112 to classify the input audio signal received from input transducer 115 by attributing at least one class from a plurality of predetermined sound classes to the input audio signal. Exemplary classes may include, but are not limited to, low ambient noise, high ambient noise, traffic noise, music, machine noise, babble noise, public area noise, background noise, speech, non-speech, speech in quiet, speech in babble, speech in noise, speech from the user, speech from a significant other, background speech, speech from multiple sources, quiet indoor, quiet outdoor, speech in a car, speech in traffic, speech in a reverberating environment, speech in wind noise, speech in a lounge, car noise, applause, music, e.g. classical music, and/or the like. In some instances, the different audio processing instructions can be associated with different classes. Further, the different audio processing instructions associated with the different classes may each also be associated with a safety index indicative of a user safety when the respective audio processing instructions are applied. In particular, the different audio processing instructions can thus be comparable in a way to decide whether audio processing instructions currently applied are less safe for the user than other audio processing instructions which may be applied instead. Thus, under certain circumstances, audio processing instructions related to a lower user safety can be replaced with audio processing instructions related to a higher user safety. As another example, memory 113 may be configured to store instructions used by processor 112 to determine a confidence measure indicative of a probability that a sound class which has been attributed to the input audio signal has been correctly attributed. In particular, depending on whether the confidence measure is below a threshold, current audio processing instructions related to a lower user safety may be replaced with audio processing instructions related to a higher user safety.

Memory 113 may comprise a non-volatile memory from which the maintained data may be retrieved even after having been power cycled, for instance a flash memory and/or a read only memory (ROM) chip such as an electrically erasable programmable ROM (EEPROM). A non-transitory computer-readable medium may thus be implemented by memory 113. Memory 113 may further comprise a volatile memory, for instance a static or dynamic random access memory (RAM).

As illustrated, hearing device 110 may further comprise a communication port 119. Communication port 119 may be implemented by any suitable data transmitter and/or data receiver and/or data transducer configured to exchange data with another device. For instance, the other device may be another hearing device configured to be worn at the other ear of the user than hearing device 110 and/or a communication device such as a smartphone, smartwatch, tablet and/or the like. Communication port 119 may be configured for wired and/or wireless data communication. For instance, data may be communicated in accordance with a Bluetooth™ protocol and/or by any other type of radio frequency (RF) communication.

As illustrated, hearing device 110 may also comprise at least one further sensor 125 communicatively coupled to processor 112 in addition to input transducer 115. A sensor unit 120 may comprise input transducer 115 and the at least one further sensor 125. Some examples of a sensor which may be implemented in sensor unit 120 in place of sensor 125 are illustrated in FIG. 2.

Figure 2:
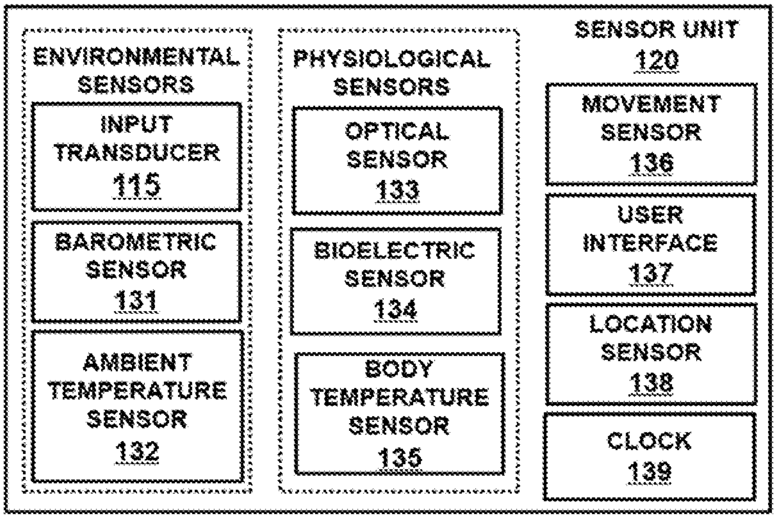
FIG. 2 schematically illustrates an exemplary sensor unit comprising one or more sensors which may be implemented in the hearing device illustrated in FIG. 1.

As illustrated in FIG. 2, sensor unit 120 may include at least one environmental sensor configured to provide environmental data indicative of a property of the environment of the user in addition to input transducer 115, for example a barometric sensor 131 and/or an ambient temperature sensor 132. Sensor unit 120 may include at least one physiological sensor configured to provide physiological data indicative of a physiological property of the user, for example an optical sensor 133 and/or a bioelectric sensor 134 and/or a body temperature sensor 135. Optical sensor 133 may be configured to emit the light at a wavelength absorbable by an analyte contained in blood such that the physiological sensor data comprises information about the blood flowing through tissue at the ear. E.g., optical sensor 133 can be configured as a photoplethysmography (PPG) sensor such that the physiological sensor data comprises PPG data, e.g. a PPG waveform. Bioelectric sensor 134 may be implemented as a skin impedance sensor and/or an electrocardiogram (ECG) sensor and/or an electroencephalogram (EEG) sensor and/or an electrooculography (EOG) sensor.

Sensor unit 120 may include a movement sensor 136 configured to provide movement data indicative of a movement of the user, for example an accelerometer and/or a gyroscope and/or a magnetometer. Sensor unit 120 may include a user interface 137 configured to provide interaction data indicative of an interaction of the user with hearing device 110, e.g., a touch sensor and/or a push button. Sensor unit 120 may include at least one location sensor 138 configured to provide location data indicative of a current location of the user, for instance a GPS sensor. Sensor unit 120 may include at least one clock 139 configured to provide time data indicative of a current time. Context data may be defined as data indicative of a local and/or temporal context of the data provided by other sensors 115, 131-137. Context data may comprise the location data and/or the time data provided by location sensor 138 and/or clock 139. Context data may also be received from an external device via communication port 119, e.g., from a communication device. E.g., one or more of sensors 115, 131-137 may then be included in the communication device. Sensor unit 120 may include further sensors providing sensor data indicative of a property of the user and/or the environment and/or the context.

Figure 3:
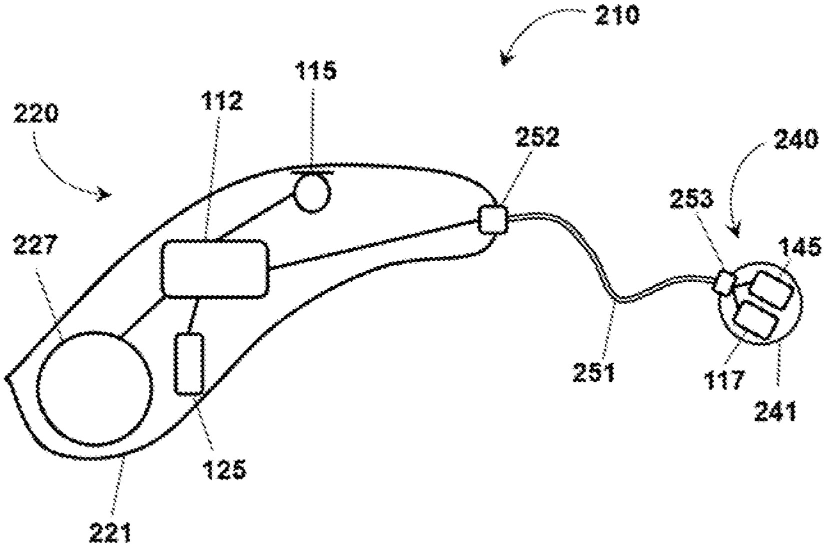
FIG. 3 schematically illustrates an embodiment of the hearing device illustrated in FIG. 1 as a RIC hearing aid.

FIG. 3 illustrates an exemplary implementation of hearing device 110 as a RIC hearing aid 210. RIC hearing aid 210 comprises a BTE part 220 configured to be worn at an ear at a wearing position behind the ear, and an ITE part 240 configured to be worn at the ear at a wearing position at least partially inside an ear canal of the ear. BTE part 220 comprises a BTE housing 221 configured to be worn behind the ear. BTE housing 221 accommodates processor 112 communicatively coupled to input transducer 115 and may also include further sensor 125, which may include any of sensors 115, 131-139. BTE part 220 further includes a battery 227 as a power source. ITE part 240 is an earpiece comprising an ITE housing 241 at least partially insertable in the ear canal. ITE housing 241 accommodates output transducer 117 and may also include another sensor 241, which may include any of sensors 115, 131-139. Sensor unit 120 of exemplary RIC hearing aid 210 thus comprises input transducer 115 and sensors 125, 245. BTE part 220 and ITE part 240 are interconnected by a cable 251. Processor 112 is communicatively coupled to output transducer 117 and sensor 245 of ITE part 240 via cable 251 and cable connectors 252, 253 provided at BTE housing 221 and ITE housing 241.

Figure 4:
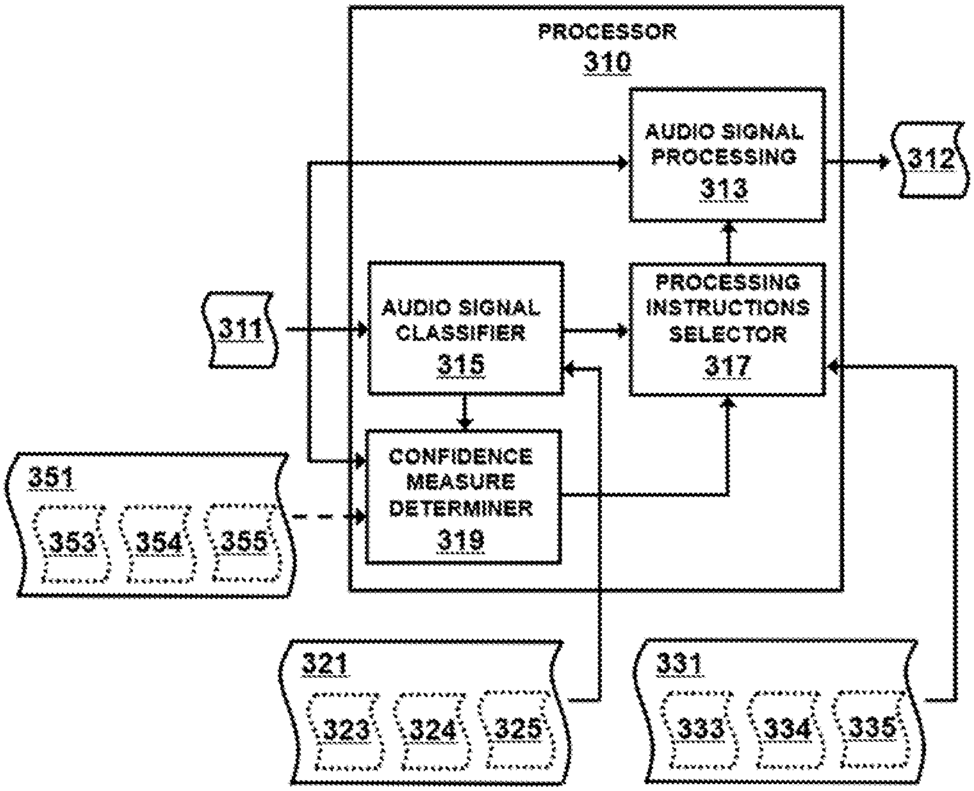
FIG. 4 schematically illustrates an exemplary algorithm of processing an input audio signal according to principles described herein.

FIG. 4 illustrates a functional block diagram of an exemplary audio signal processing algorithm that may be executed by a processor 310. For instance, processor 310 may comprise processor 112 of hearing device 110 and/or another processor communicatively coupled to processor 112. As shown, the algorithm is configured to be applied to an input audio signal 311 indicative of a sound detected in the environment of the user, which may be provided by input transducer 115. After a processing of input audio signal 311, the algorithm provides a processed input audio signal based on which an output audio signal 312 can be outputted by output transducer 117.

The algorithm comprises an audio signal processing module 313, an audio signal classification module 315, a processing instructions selection module 317, and a confidence measure determination module 319. Input audio signal 311 is received by audio signal classification module 315. Audio signal classification module 315 is configured to classify the audio signal 311 by attributing at least one class from a plurality of predetermined classes to the audio signal 311. To this end, audio signal classification module 315 may comprise an audio signal analyzer module configured to analyze audio signal 311 to determine a characteristic of audio signal 311. For instance, the audio signal analyzer may be configured to provide a feature vector from audio signal 311 and/or to identify at least one signal feature in audio signal 311. Exemplary characteristics and/or features include, but are not limited to, a mean-squared signal power, a standard deviation of a signal envelope, a mel-frequency cepstrum (MFC), a mel-frequency cepstrum coefficient (MFCC), a delta mel-frequency cepstrum coefficient (delta MFCC), a spectral centroid such as a power spectrum centroid, a standard deviation of the centroid, a spectral entropy such as a power spectrum entropy, a zero crossing rate (ZCR), a standard deviation of the ZCR, a broadband envelope correlation lag and/or peak, and a four-band envelope correlation lag and/or peak. For example, the audio signal analyzer may determine the characteristic from audio signal 311 using one or more algorithms that identify and/or use zero crossing rates, amplitude histograms, auto correlation functions, spectral analysis, amplitude modulation spectrums, spectral centroids, slopes, roll-offs, auto correlation functions, and/or the like. In some instances, the characteristic determined from audio signal 311 is characteristic of an ambient noise in an environment of the user, for instance a noise level, and/or a speech, for instance a speech level. The audio signal analyzer may be configured to divide audio signal 311 into a number of segments and to determine the characteristic from a particular segment, for instance by extracting at least one signal feature from the segment. The extracted feature may be processed to assign the audio signal to the corresponding class.

Audio signal classification module 315 can attribute, e.g., depending on the characteristics and/or features determined from audio signal 311 by the audio signal analyzer, at least one sound class from a plurality of predetermined classes to audio signal 311. E.g., the characteristics and/or signal features may be processed to assign audio signal 311 to one or more corresponding classes. The classes may represent a specific content in the audio signal. Exemplary classes include, but are not limited to, low ambient noise, high ambient noise, traffic noise, music, machine noise, babble noise, public area noise, background noise, speech, non-speech, speech in quiet, speech in babble, speech in noise, speech from the user, speech from a significant other, background speech, speech from multiple sources, speech from multiple sources, quiet indoor, quiet outdoor, speech in a car, speech in traffic, speech in a reverberating environment, speech in wind noise, speech in a lounge, car noise, applause, music, e.g. classical music, and/or the like. To this end, information about the plurality of predetermined classes 323, 324, 325 may be stored in a database 321 and accessed by audio signal classification module 315. E.g., the information may comprise different patterns associated with each class 323-325, wherein it is determined whether audio signal 311, in particular the characteristics and/or features determined from audio signal 311, matches, at least to a certain extent, the respective pattern such that the respective class 323-325 can be attributed to the audio signal 311. In particular, a probability may be determined whether the respective pattern associated with the respective class 323-325 matches the characteristics and/or features determined from audio signal 311, wherein the respective class 323-325 may be attributed to audio signal 311 when the probability exceeds a threshold.

The one or more classes 323-325 attributed to audio signal 311 can then be employed by processing instructions selection module 317 to select audio processing instructions 333, 334, 335 which are associated with the one or more classes 323-325 attributed to audio signal 311. In particular, each of audio processing instructions 333, 334, 335 may be associated with at least one respective class 323, 324, 325, or a plurality of respective classes 323-325. For example, audio processing instructions 333, 334, 335 may be stored in a database 331 and accessed by processing instructions selection module 317. For instance, audio processing instructions 333-335 may be implemented as different audio processing programs and/or different audio processing programs which can be executed by audio signal processing module 313. For instance, audio processing instructions 323-325 may include instructions executable by processor 310 providing for at least one gain model (GM), noise cancelling (NC), wind noise cancelling (WNC), reverberation cancelling (RevC), narrowband coupling, feedback cancelling (FC), speech enhancement (SE), noise cleaning, beamforming (BF), in particular static and/or adaptive beamforming, and/or the like. E.g., at least one of audio processing instructions 323-325 may implement a beamforming in a rear direction of the user and at least another one of audio processing instructions 323-325 may implement a beamforming in a front direction of the user.

In some instances, e.g., when audio signal classification module 315 is implemented as a mixed-mode classifier, at least one of classes 323-325, e.g., two or more classes 323-325, can be attributed to the audio signal 311. For instance, when a probability that the respective pattern associated with a plurality of classes 323-325 matches audio signal 311 is determined to exceed a respective threshold, the plurality of classes 323-325 may be attributed to audio signal 311. Processing instructions selection module 317 can then be configured to select the audio processing instructions 333-335 associated with the plurality of classes 323-325 attributed to audio signal 311. For instance, the different audio processing instructions 333-335 associated with the different classes 323-325 may be mixed when executed by audio signal processing module 313, e.g., in dependence of class similarity factors indicative of a similarity of the current acoustic environment with a respective predetermined acoustic environment associated with the different classes, as disclosed in EP 1 858 292 B1 and EP 2 201 793 B1.

Audio processing instructions 333-335 can be related to a safety of the user, in particular to a different degree of the user's safety. E.g., when audio processing instructions 333-335 related to a higher user safety are executed by audio signal processing module 313, the user may be less easily distracted from a potentially dangerous situation and/or more easily identify a potential source of danger in his environment as compared to when audio processing instructions 333-335 related to a lower user safety are executed. In particular, each of audio processing instructions 333-335 may be related to a safety index indicative of a user safety when the respective audio processing instructions are applied. For instance, applying audio processing instructions 333-335 related to a lower safety index may constitute a more dangerous situation and/or a more threatening state for the user as compared to applying audio processing instructions 333-335 related to a higher safety index.

To illustrate, audio processing instructions 323-325 providing for a beamforming in a rear direction of the user may be related to a lower safety index as compared to audio processing instructions 323-325 providing for a beamforming in a front direction of the user. In particular, the directivity in the front direction corresponds to the direction of the user's eyesight and complements his visual field, e.g., when the user is walking or looking around or reorienting himself, which contributes to the user's safety, whereas the directivity in the rear direction cannot complement the user's eyesight in a way to assist the user to avoid potentially dangerous situations appearing within his viewing angle. As another example, audio processing instructions 323-325 providing for an enhancement of listening to music, e.g., music emitted from a sound source in the environment of the user and/or music streamed from a remote server, may be related to a lower safety index as compared to audio processing instructions 323-325 of a gain model only compensating for a hearing loss of the user which is optimized for listening to sounds in the user's environment. In particular, an enhancement of music emitted from a sound source, which is rather unlikely to pose a threat to the user, can potentially distract the user from other sound sources which could be dangerous.

As a further example, audio processing instructions 323-325 providing for a noise suppression in a rather loud environment in order to enhance an understanding of speech in the environment may be related to a lower safety index as compared to audio processing instructions 323-325 providing for noise suppression in a less noisy environment for the same purpose, which may be related to a lower safety index as compared to audio processing instructions 323-325 providing for speech enhancement in a quiet environment. In particular, those audio processing instructions 323-325 may be mutually exclusive and/or may be associated with different classes 323-325 which may be attributed to a "speech in loud noise", "speech in noise", and "speech in quiet" determined in the audio signal 311. To illustrate, a rather aggressive noise suppression algorithm, which may be applied when a "speech in loud noise" environment is determined in the audio signal 311, may suppress sound contributions from potentially dangerous sound sources in the audio signal 311 to a larger extent as compared to a less aggressive noise suppression algorithm, which may be applied when a "speech in noise" environment is determined in the audio signal 311. Similarly, a noise suppression algorithm applied in a "speech in noise" environment to facilitate speech understanding can lead to a more aggressive modification of the audio signal 311 to also suppress contributions of potentially dangerous sound sources as compared to a speech enhancement algorithm in a "speech in quiet" environment.

Confidence measure determination module 319 can determine a confidence measure indicative of a probability that the at least one class 323-325, in particular the one or more classes 323-325, has been correctly attributed to the audio signal 311 by audio signal classification module 315. Further, when the probability indicated by the confidence measure is below a threshold and the audio processing instructions 323-325 associated with the at least one class 323-325 attributed to the audio signal 311 comprise audio processing instructions 323-325 related to a lower user safety, confidence measure determination module 319 can control processing instructions selection module 317 to select audio processing instructions 323-325 related to a higher user safety which can then be executed by audio signal processing module 313 in place of the audio processing instructions 323-325 related to the lower user safety.

To illustrate, the confidence measure determined by confidence measure determination module 319 may be regarded as a measure whether the class 323-325 attributed to the audio signal 311 is adequate or inadequate with regard to the momentary environment and/or momentary situation of the user. In particular, when the confidence measure is below the threshold, the class 323-325 may be regarded as inadequately attributed to the audio signal 311, and, when the confidence measure is above the threshold, the class 323-325 may be regarded as adequately attributed to the audio signal 311. In order to mitigate a safety risk for the user in a case in which the class 323-325 attributed to the audio signal 311 is associated with audio processing instructions 323-325 related to a lower user safety and has been inadequately attributed to the audio signal 311, which may be indicated by the confidence measure determined to be below said threshold, the audio processing instructions 323-325 related to the lower user safety can be replaced with audio processing instructions 323-325 related to a higher user safety. To this end, confidence measure determination module 319 may determine adequate audio processing instructions 323-325 which are related to the higher user safety. Further, confidence measure determination module 319 may control processing instructions selection module 317 to select the audio processing instructions 323-325 related to the higher user safety such that they can be executed by audio signal processing module 313 in place of the audio processing instructions 323-325 related to the lower user safety.

In some implementations, confidence measure determination module 319 may determine the confidence measure depending on a temporal consistency in which the at least one class 323-325 is attributed to the audio signal 311 by audio signal classification module 315. To this end, audio signal classification module 315 can be configured to communicate the at least one class 323-325 which has been attributed to the audio signal 311 and/or at least one another class 323-325 which has momentarily not been attributed to the audio signal 311 and/or the respective probability whether the pattern associated with the respective class 323-325 matches the characteristics and/or features determined from audio signal 311 to confidence measure determination module 319. In particular, confidence measure determination module 319 may be configured to monitor the at least one class 323-325 which has been attributed to the audio signal 311 by audio signal classification module 315 over time to determine a change rate in which different classes 323-325 are attributed to the audio signal 311. The confidence measure may then be determined based on the change rate.

To illustrate, in a momentary environment and/or situation of the user in which the at least one class 323-325 which has been attributed to the audio signal 311 does not change over time, at least for a certain minimum period of time, a confidence that the class 323-325 has been correctly attributed to the audio signal 311 may be estimated as rather high. Conversely, in a momentary environment and/or situation of the user in which the at least one class 323-325 which has been attributed to the audio signal 311 changes over time, e.g., within a certain period of time, a confidence that the class 323-325 has been correctly attributed to the audio signal 311 may be estimated as rather low. In the latter case, when the confidence has been estimated as rather low and when the audio processing instructions 323-325 associated with the at least one class 323-325 are also related to a lower user safety, confidence measure determination module 319 may control processing instructions selection module 317 to select audio processing instructions 323-325 which are related to the higher user safety such that they can be executed by audio signal processing module 313 in place of the audio processing instructions 323-325 related to the lower user safety. For instance, when the at least one class 323-325 which has been attributed to the audio signal 311 changes over time between at least one class 323-325 associated with audio processing instructions 323-325 related to a lower user safety and between at least one another class 323-325 associated with audio processing instructions 323-325 related to a higher user safety, confidence measure determination module 319 may control processing instructions selection module 317 to select the audio processing instructions 323-325 which are related to the higher user safety.

In some implementations, confidence measure determination module 319 may determine the confidence measure depending on a content-related consistency in which the at least one class 323-325 is attributed to the audio signal 311 by audio signal classification module 315. To this end, at least one characteristics of sensor data 311, 351, which may comprise audio signal 311 and/or other sensor data 351, may be evaluated with regard to whether the sensor data 311, 351 fulfills a condition. In particular, the probability indicated by the confidence measure that class 323-325 is correctly attributed to audio signal 311 may be increased when the condition is fulfilled. Sensor data 351 may comprise environmental sensor data 353 indicative of a property of the user's environment, which may be provided by any of environmental sensors 115, 131, 132, and/or physiological sensor data 354 indicative of a property of the user, which may be provided by any of physiological sensors 133, 134, 135, and/or movement data 355 indicative of a movement of the user, which may be provided by movement sensor 136, and/or location data indicative of a location of the user, which may be provided by location sensor 136, and/or user interaction data indicative of a user interaction, which may be provided by user interface 137, and/or a time, which may be provided by clock 139. In particular, the content of audio signal 311 and/or the content of other sensor data 351 may be evaluated by confidence measure determination module 319 with regard to whether at least one characteristic is indicative of a momentary environment and/or situation of the user which is consistent with the at least one class 323-325 which has been attributed to the audio signal 311 by confidence measure determination module 319.

To illustrate, a property of a momentary environment and/or situation of the user may be determined based on at least one characteristic of audio signal 311, in particular with regard to a condition to be fulfilled by audio signal 311. E.g., a volume level of audio signal 311 may indicate whether the user is inside or outside a closed compartment such as e.g., inside a vehicle. Thus, a content-related consistency whether a class relevant for the user being inside a vehicle, e.g., a class denoted "speech in a car", is correctly attributed to the audio signal 311 may be determined depending on whether the volume level of audio signal 311 is typical for an interior environment inside a car. As another example, a direction of arrival (DOA) from which at least part of the detected sound arrives at the user, which may be determined based on audio signal 311 as detected by a microphone array, may indicate whether a speech source, in particular a sole speech source, is located behind the user, in particular whether the speech source is detected from the back hemisphere of the user. This can further confirm a content-related consistency whether a class relevant for the user being seated at the driver's seat inside a vehicle, e.g., as required for the class denoted "speech in a car", is correctly attributed to the audio signal 311, which class may be associated with audio processing instructions 323-325 providing for a directivity of a beamformer in the back direction of the user's head.

As another example, a property of a momentary environment and/or situation of the user may be determined based on at least one characteristic of movement data 355, in particular with regard to a condition to be fulfilled by movement data 355. E.g., a movement pattern contained in movement data 355 may indicate whether the user is seated which may be regarded as another requirement of the user being located inside a vehicle. As another example, a movement pattern contained in movement data 355 may indicate whether the user is not turning his head around but only looking into a front direction which may be regarded as a further requirement of the user being located inside a vehicle, in particular at the driver seat of the vehicle. Thus, a content-related consistency whether a class relevant for the user being inside a vehicle, e.g., a class denoted "speech in a car", is correctly attributed to the audio signal 311 may be determined depending on whether a movement pattern contained in movement data 355 is typical for the user being seated, in particular at a driver's seat of a car.

Overall, a content-related consistency indicative of whether the at least one class 323-325 has been correctly attributed to the audio signal 311 by audio signal classification module 315 may be determined based on a check list whether various characteristics of sensor data 311, 351 fulfill a respective condition which is pointing towards typical properties of a momentary environment and/or situation of the user for which the respective class 323-325 is intended for. Accordingly, in a case in which the sensor data 311, 351 fulfills the at least one condition, the confidence measure may be provided such that the probability indicated by the confidence measure that the at least one class 323-325 has been correctly attributed to the audio signal 311 is increased.

Figure 5:
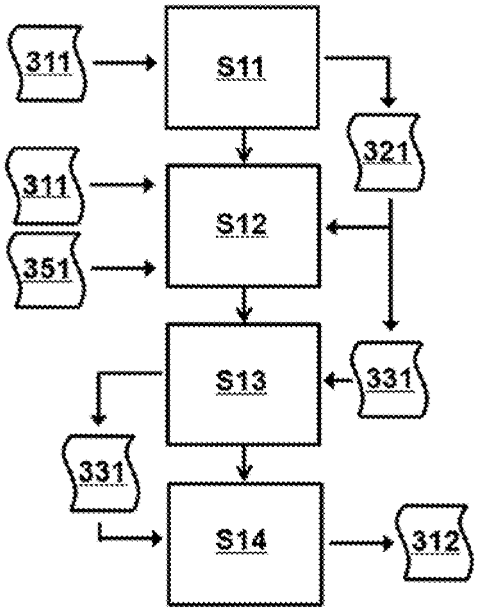
FIGS. 5-6 schematically illustrate some exemplary methods of processing an input audio signal according to principles described herein.

FIG. 5 illustrates a block flow diagram for an exemplary method of processing input audio signal 311 indicative of a sound detected in the environment of the user. The method may be executed by processor 310 of hearing device 110 and/or another processor communicatively coupled to processor 310. At operation S11, input audio signal 511, as provided by input transducer 115, is classified by attributing at least one class from a plurality of predetermined classes 321, 323, 324, 325 to audio signal 311, wherein different audio processing instructions 331, 333, 334, 335 are associated with different classes 321, 323, 324, 325.

At operation S12, a confidence measure is determined, wherein the confidence measure is indicative of a probability that the class 321, 323, 324, 325 is correctly attributed to input audio signal 311. As illustrated, the confidence measure may be determined based on input audio signal 311 and/or based on other sensor data 351. In particular, the confidence measure may be determined depending on a temporal consistency in which the at least one class 323-325 is attributed to the audio signal 311 and/or depending on a content-related consistency in which the at least one class 323-325 is attributed to the audio signal 311. Regarding the temporal consistency, the at least one class 323-325 which has been attributed to the audio signal 311 may be monitored over time to determine a change rate in which different classes 323-325 are attributed to audio signal 311, wherein the confidence measure is determined based on the change rate. E.g., when the change rate is rather high indicating a strong temporal fluctuation of different classes 323-325 which are attributed to audio signal 311 at S11, the confidence measure may be determined to be rather low. Conversely, when the change rate is rather low indicating a negligible or small fluctuation of different classes 323-325 which are attributed to audio signal 311 at S11 over time, the confidence measure may be determined to be rather high. Regarding the consistency in content, at least one characteristic of sensor data 311, 351 can be evaluated with regard to whether the sensor data 311, 351 fulfills a condition. To this end, sensor data 311, 351 may be received by processor 310, e.g., from any of sensors 115, 131-139. E.g., when the condition is determined to be fulfilled, which may indicate that typical properties of a momentary environment and/or situation of the user for which the respective class 323-325 is representative are currently met, the confidence measure may be determined to be rather high. Conversely, when the condition is determined to be not fulfilled, which may indicate that typical properties of a momentary environment and/or situation of the user for which the respective class 323-325 is representative for are currently not met, the confidence measure may be determined to be rather low.

At operation S13, audio processing instructions 331, 333, 334, 335 are selected which may be associated with at least one of the different classes 321, 323, 324, 325 attributed to audio signal 311 at S11. In a case in which the confidence measure determined at S12 is rather low, in particular below a predetermined threshold, and the audio processing instructions 331, 333, 334, 335 which are associated with at least one of the different classes 321, 323, 324, 325 which has been attributed to input audio signal 311 at S11 are related to a lower user safety, audio processing instructions 331, 333, 334, 335 related to a higher user safety are selected in place of the audio processing instructions 331, 333, 334, 335 related to the lower user safety. In particular, even if the audio processing instructions 331, 333, 334, 335 related to the lower user safety are associated with class 321, 323, 324, 325 which has been attributed to input audio signal 311 at S11, audio processing instructions 331, 333, 334, 335 related to the higher user safety are selected at S13 to replace the audio processing instructions 331, 333, 334, 335 related to the lower user safety. In this way, a potential security risk for the user can be mitigated by ensuring that, in a case of doubt that audio processing instructions 331, 333, 334, 335 related to the lower user safety would be adequate for the momentary environment and/or situation of the user, audio processing instructions 331, 333, 334, 335 related to the higher user safety are employed.

At operation S14, the audio processing instructions 331, 333, 334, 335 selected at S13 are applied to input audio signal 311 in order to modify the input audio signal 311. Based on the modified input audio signal 311, an output audio signal 312 can be outputted by output transducer 117.

In some implementations, when the confidence measure is determined at S12 by determining a change rate in which different classes 323-325 are attributed to the audio signal 311 over time at S11, the audio processing instructions 323-325 related to the higher user safety which are selected at S13 may correspond to the audio processing instructions 323-325 associated with at least one of the classes 323-325 which has been attributed to the audio signal 311 at S11 within the determined change rate but has then been exchanged by at least another one of the classes 323-325 related to a lower user safety attributed to the audio signal 311 at another time at S11. E.g., when monitoring the different classes 323-325 at S12 which are attributed to the audio signal 311 over time at S11, a safety index which is related to the audio processing instructions 323-325 associated with the class 323-325 currently attributed to the audio signal 311 may also be monitored, and the audio processing instructions 323-325 which are related to a higher safety index may then be selected at S13 to be applied at S14, in particular to be constantly applied, in place of also selecting processing instructions 323-325 which are related a lower safety index. Thus, when classes 323-325 attributed to audio signal 311 change over time at S11 according to the determined change rate, only the audio processing instructions 323-325 related to a higher user safety, in particular related to a higher safety index, may be applied at S14, in particular constantly applied.

To illustrate, the audio processing instructions 323-325 related to the lower user safety may effectuate a directivity of audio content in the audio signal 311 in a direction of the user's back, e.g., by directing a beamformer in this direction. The audio processing instructions 323-325 related to the higher user safety may effectuate a directivity of audio content in the audio signal 311 in a direction of the user's front, e.g., by directing a beamformer in this direction. For instance, the audio processing instructions 323-325 related to the lower user safety may be associated with a class 323-325 denoted "speech in a car". The audio processing instructions 323-325 related to the higher user safety may be associated with another class 323-325 which may be representative of a momentary environment and/or situation of the user outside of a car. The confidence measure may be determined at S12 by determining a change rate in which the class 323-325 associated with the audio processing instructions 323-325 related to the higher user safety and the class 323-325 associated with the audio processing instructions 323-325 related to the lower user safety are alternatingly and/or alternatively attributed to the audio signal 311 at S11. When the confidence measure is below the threshold, e.g., when the respective classes 323-325 alternate and/or fluctuate rather often and/or quickly over time when the classes 323-325 are attributed to the audio signal 311 at S11, only the audio processing instructions 323-325 related to the higher user safety may be selected at S13 to be applied at S14 to modify the audio signal 311.

As another example, the audio processing instructions 323-325 related to the lower user safety may effectuate an enhanced music listening experience and the audio processing instructions 323-325 related to the higher user safety may provide for a more general sound amplification of various sounds in the environment, in particular without a particular emphasis of a music content in the environment. E.g., the audio processing instructions 323-325 related to the lower user safety may be associated with a class 323-325 denoted "music" and the audio processing instructions 323-325 related to the higher user safety may be associated with another class 323-325 representative of a momentary environment and/or situation of the user in which the user is not particularly interested in listening to music. As a further example, the audio processing instructions 323-325 related to the lower user safety may effectuate a more aggressive noise suppression and the audio processing instructions 323-325 related to the higher user safety may effectuate a less aggressive noise suppression. E.g., the audio processing instructions 323-325 related to the lower user safety may be associated with a class 323-325 representative of a rather loud ambient environment, which may, e.g., also contain speech, and the audio processing instructions 323-325 related to the higher user safety may be associated with a class 323-325 representative of a more silent ambient environment.

In some implementations, when the confidence measure is determined at S12 to be below the threshold, the audio processing instructions 323-325 related to the higher user safety which are selected at S13 may be predetermined. E.g., when the audio processing instructions 323-325 associated with the class 323-325 attributed to the audio signal 311 at S11 are related to a safety index below a threshold, in particular a predetermined threshold for the safety index, the audio processing instructions 323-325 which are selected at S13 may be predetermined to be related to a safety index above the threshold. In this way, it may be ensured that the audio processing instructions 323-325 which are applied at S14 are related to the safety index above the threshold. A safety risk for the user caused by an inappropriate classification of the audio signal 311 may thus be circumvented.

Figure 6:
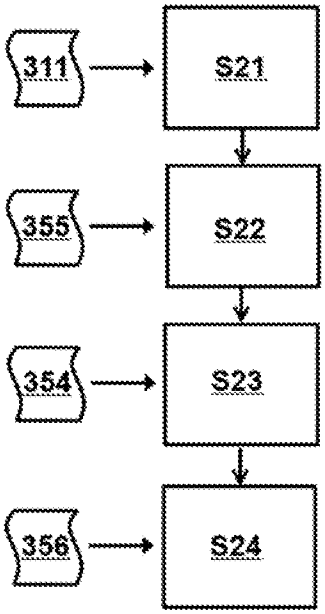

FIG. 6 illustrates a block flow diagram for an exemplary method of determining a confidence measure indicative of a probability that the class 323-325 which has been attributed to the audio signal 311 at S11 has been correctly attributed. In particular, the method may be executed in place of operation S12 of the method illustrated in FIG. 5. At operation S21, the confidence measure is determined based on input audio signal 311. In this regard, at least one characteristic of audio signal 311 is evaluated to determine whether the characteristic fulfills a condition. The characteristic may comprise, e.g., a volume level and/or a direction of arrival (DOA) of a detected sound and/or a property of a sound source in the user's environment. In particular, the condition may be determined to be fulfilled when a property of a momentary environment and/or situation of the user for which the class 323-325 has been attributed to the audio signal 311 is consistent with the characteristic. E.g., the characteristic may match a typical property of the environment and/or situation for which the class 323-325 has been attributed to the audio signal 311. To illustrate, when the class 323-325 attributed to audio signal 311 is representative of an environment inside a vehicle, the condition may comprise that the volume level of audio signal 311 is typical for a sound detected in the vehicle's interior. Further, when the class 323-325 is also representative of a situation in which the user is seated at a front seat of the vehicle, e.g., at the driver's seat, and listening to speech of a person sitting on a back seat of the vehicle, the condition may further comprise that a direction of arrival (DOA) of a speech contained in the audio signal 311, in particular of a sole speech contained in the audio signal 311, is determined at the backside of the user's head and/or that a property of a sound source in the user's environment corresponds to a speech.

At operation S22, the confidence measure is determined based on movement data 355. In this regard, at least one characteristic of movement data 355 is evaluated to determine whether the characteristic fulfills a condition. The characteristic may comprise, e.g., a head turning behavior of the user and/or a situation in which the user is in a resting position and/or a situation in which the user is walking or running and/or a posture of the user and/or an orientation of the user, e.g., an orientation of the user's head. To illustrate, when the class 323-325 attributed to audio signal 311 is representative of a situation in which the user is seated at a front seat of the vehicle, e.g., at the driver's seat, and listening to speech of a person sitting on a back seat of the vehicle, the condition may comprise that the user is not turning his head and/or that the user is in a resting position and/or that the posture of the user corresponds to a seated posture. As another example, when the class 323-325 attributed to audio signal 311 is representative of a situation in which the user is on the go, e.g., as a pedestrian or during a fitness activity such as running, the condition may comprise that the user is walking or running. As another example, when the class 323-325 attributed to audio signal 311 is representative of a situation in which the user is involved in a conversation with multiple people, the condition may comprise that the user is turning his head and/or changing his head orientation.

At operation S23, the confidence measure is determined based on physiological sensor data 354. In this regard, at least one characteristic of physiological sensor data 354 is evaluated to determine whether the characteristic fulfills a condition. The characteristic may comprise, e.g., a property related to the user's cardiovascular system and/or a property related to the user's brain. For instance, the property related to the user's cardiovascular system may be determined based on physiological sensor data 354 provided by optical sensor 133 such as a photoplethysmography (PPG) sensor and/or bioelectric sensor 134 such as an electrocardiography (ECG) sensor. For instance, the property related to the user's cardiovascular system may comprise at least one of a heart rate, a blood pressure, a heart rate variability (HRV), an oxygen saturation index (SpO2), a maximum rate of oxygen consumption (VO2max), and a concentration of an analyte contained in the tissue, such as water and/or glucose. For instance, the property related to the user's brain may be determined based on physiological sensor data 354 provided by bioelectric sensor 134 such as an electroencephalogram (EEG) sensor. For instance, the property related to the user's brain may comprise at least one of a cognitive load and/or a listening effort and/or a listening intention and/or a concentration level and/or a stress level and/or a nervousness and/or a level of fatigue. To illustrate, when the class 323-325 attributed to audio signal 311 is representative of a situation in which the user is involved in a conversation, the condition may comprise that a listening effort and/or a listening intention of the user is above a threshold. As another example, when the class 323-325 attributed to audio signal 311 is representative of a situation in which the user has difficulties to concentrate, e.g., to focus on sound emitted from potential sources of danger in his environment, the condition may comprise that a stress level and/or a nervousness and/or a level of fatigue of the user is above the threshold. As another example, when the class 323-325 attributed to audio signal 311 is representative of a situation in which the user is in a critical health situation, e.g., when the user potentially requires to get help from people in his environment because of a health condition and therefore may require to identify speech from those people, the condition may comprise that a heart rate and/or a blood pressure and/or a blood glucose level exceeds a critical value.

At operation S24, the confidence measure is determined based on location and/or time data 356. In this regard, at least one characteristic of location and/or time data 356 is evaluated to determine whether the characteristic fulfills a condition. The characteristic may comprise, e.g., a momentary location of the user and/or a current time and/or date. For instance, the momentary location of the user may be determined based on location data 356 provided by location sensor 138. The current time and/or date may be determined based on time data 356 provided by clock 139. To illustrate, when the class 323-325 attributed to audio signal 311 is representative of a situation in which the user is involved in a traffic situation, the condition may comprise that location data 356 corresponds to a location of a high traffic volume and/or a traffic area. As another example, when the class 323-325 attributed to audio signal 311 is representative of a situation in which the user is at home, the condition may comprise that location data 356 corresponds to the user's residence. As another example, when the class 323-325 attributed to audio signal 311 is representative of a situation in which the user is resting, the condition may comprise that time data 356 corresponds to a time during which the user is usually resting, e.g., at noon and/or during the night.

While the principles of the disclosure have been described above in connection with specific devices and methods, it is to be clearly understood that this description is made only by way of example and not as limitation on the scope of the invention. The above described embodiments are intended to illustrate the principles of the invention, but not to limit the scope of the invention. Various other embodiments and modifications to those embodiments may be made by those skilled in the art without departing from the scope of the present invention that is solely defined by the claims. In the claims, the word "comprising" does not exclude other elements or steps, and the indefinite article "a" or "an" does not exclude a plurality. A single processor or controller or other unit may fulfil the functions of several items recited in the claims. The mere fact that certain measures are recited in mutually different dependent claims does not indicate that a combination of these measures cannot be used to advantage. Any reference signs in the claims should not be construed as limiting the scope.

The invention claimed is:

1. A method of operating a hearing device configured to be worn at an ear of a user, the hearing device comprising an input transducer configured to provide an audio signal indicative of a sound detected in an environment of the user and an output transducer configured to generate a sound output according to the audio signal after a modifying of the audio signal, the method comprising classifying the audio signal by attributing at least one class from a plurality of predetermined classes to the audio signal, wherein different audio processing instructions are associated with different classes; and modifying the audio signal by applying the audio processing instructions associated with the class attributed to the audio signal, characterized in that the audio processing instructions associated with at least one of said classes comprise audio processing instructions related to a lower user safety which can be replaced by audio processing instructions related to a higher user safety, the method further comprising determining a confidence measure indicative of a probability that the class is correctly attributed to the audio signal; and, when the probability indicated by the confidence measure is below a threshold and the audio processing instructions associated with the class attributed to the audio signal comprise the audio processing instructions related to the lower user safety, applying, during said modifying of the audio signal, the audio processing instructions related to the higher user safety in place of the audio processing instructions related to the lower user safety;

wherein said modifying of the audio signal performs a beamforming with a directivity of audio content in the modified audio signal in a front or back direction of the user when the audio processing instructions related to the lower user safety is applied; and wherein said modifying of the audio signal performs a beamforming with a directivity of audio content in the modified audio signal in omnidirection of the user when the audio processing instructions related to the higher user safety is applied.

2. The method of claim 1, further comprising monitoring said classifying of the audio signal over time to determine a change rate in which different classes are attributed to the audio signal, wherein the confidence measure is determined based on the change rate.

3. The method of claim 1, further comprising determining, based on the audio signal, a volume level of the detected sound, wherein the confidence measure is determined based on the volume level.

4. The method of claim 1, further comprising determining, based on the audio signal, a direction of arrival from which at least part of the detected sound arrives at the user, wherein the confidence measure is determined based on the direction of arrival.

5. The method of claim 1, further comprising identifying, based on the audio signal, a property of a sound source in the environment of the user from which at least part of the detected sound is emitted, wherein the confidence measure is determined based on the property of the sound source.

6. The method of claim 1, the hearing device further comprising a sensor configured to provide sensor data indicative of a property of the user and/or an ambient environment of the user, the method comprising determining whether the sensor data fulfills a condition, wherein the probability indicated by the confidence measure is increased when the condition is fulfilled.

7. The method of claim 6, wherein the sensor comprises a movement sensor configured to provide at least part of the sensor data as movement data indicative of a movement of the hearing device; and/or a location sensor configured to provide at least part of the sensor data as location data indicative of a current location of the user; and/or a physiological sensor configured to provide at least part of the sensor data as physiological data indicative of a physiological property of the user; and/or an environmental sensor configured to provide at least part of the sensor data as environmental data indicative of a property of the environment of the user.

8. The method of claim 7, further comprising at least one of determining, based on the movement data, whether the user is turning his head, wherein the condition is determined to be fulfilled depending on whether the user is turning his head;

determining, based on the movement data, whether the user is in a resting position, wherein the condition is determined to be fulfilled depending on whether the user is in the resting position;

determining, based on the movement data, whether the user is walking or running, wherein the condition is determined to be fulfilled depending on whether the user is walking or running;

determining, based on the movement data, a posture of the user, wherein the condition is determined to be fulfilled depending on the posture of the user; and determining, based on the movement data, an orientation of the user, wherein the condition is determined to be fulfilled depending on the orientation.

9. The method of claim 1 further comprising monitoring, when the probability indicated by the confidence measure is below the threshold and the audio processing instructions related to the higher user safety are different from the audio processing instructions associated with the class attributed to the audio signal, the confidence measure over time to determine when said probability changes above the threshold; and, when said probability is above the threshold, applying, during said modifying of the audio signal, the audio processing instructions associated with the class attributed to the audio signal in place of the audio processing instructions related to the higher user safety.

10. The method of claim 1, wherein the audio processing instructions related to the higher user safety are associated with at least one of said classes different from the class comprising the audio processing instructions related to the lower user safety.

11. The method of claim 1, wherein, during said classifying of the audio signal, at least two of said classes are attributed to the audio signal, and, during the modifying of the audio signal, the audio processing instructions associated with the two classes attributed to the audio signal are applied, wherein, during said determining of the confidence measure, the confidence measure is determined to be indicative of a probability that at least one of the two classes attributed to the audio signal is correctly attributed.

12. A hearing device configured to be worn at an ear of a user, the hearing device comprising an input transducer configured to provide an audio signal indicative of a sound detected in an environment of the user;

a memory configured to store a plurality of audio processing instructions, wherein different audio processing instructions are associated with different classes which can be attributed to the audio signal;

an output transducer configured to generate a sound output according to the audio signal after a modifying of the audio signal; and a processor configured to classify the audio signal by attributing at least one of said classes to the audio signal; and modify the audio signal by applying the audio processing instructions associated with the class attributed to the audio signal, characterized in that the audio processing instructions associated with at least one class comprise audio processing instructions related to a lower user safety which can be replaced by audio processing instructions related to a higher user safety, the processor further configured to determine a confidence measure indicative of a probability that the class is correctly attributed to the audio signal; and, when the probability indicated by the confidence measure is below a threshold and the audio processing instructions associated with the class attributed to the audio signal comprise the audio processing instructions related to the lower user safety, apply, during said modifying of the audio signal, the audio processing instructions related to the higher user safety in place of the audio processing instructions related to the lower user safety;

wherein said modifying of the audio signal performs a beamforming with a directivity of audio content in the modified audio signal in a front or back direction of the user when the audio processing instructions related to the lower user safety is applied; and wherein said modifying of the audio signal performs a beamforming with a directivity of audio content in the modified audio signal in omnidirection of the user when the audio processing instructions related to the higher user safety is applied.

13. The method of claim 1, wherein said modifying of the audio signal further performs an enhanced music listening experience with respect to at least one of music emitted from a sound source in the environment of the user or music streamed from a remote server when the audio processing instructions related to the lower user safety is applied; and wherein said modifying of the audio signal further performs an amplification of environmental sounds without a music content when the audio processing instructions related to the higher user safety is applied.

14. The method of claim 1, wherein said modifying of the audio signal performs more aggressive noise suppression when the audio processing instructions related to the lower user safety is applied; and wherein said modifying of the audio signal performs less aggressive noise suppression when the audio processing instructions related to the higher user safety is applied.

* * * * *